United States Patent
Kobayashi et al.

(10) Patent No.: US 9,522,630 B2
(45) Date of Patent: Dec. 20, 2016

(54) VEHICULAR DISPLAY APPARATUS

(71) Applicants: DENSO CORPORATION, Kariya, Aichi-pref. (JP); Honda Motor Co., Ltd., Tokyo (JP)

(72) Inventors: Yasuhiro Kobayashi, Okazaki (JP); Ryo Kunitachi, Kariya (JP); Shinji Kamon, Wako (JP)

(73) Assignees: DENSO CORPORATION, Kariya, Aichi-pref. (JP); Honda Motor Co., Ltd., Tokyo (JP)

( * ) Notice: Subject to any disclaimer, the term of this patent is extended or adjusted under 35 U.S.C. 154(b) by 58 days.

(21) Appl. No.: 14/294,574

(22) Filed: Jun. 3, 2014

(65) Prior Publication Data

US 2014/0355236 A1    Dec. 4, 2014

(30) Foreign Application Priority Data

Jun. 4, 2013  (JP) .................................. 2013-118143

(51) Int. Cl.
  *B60Q 3/04*  (2006.01)
  *G01D 11/28*  (2006.01)
  *G12B 11/04*  (2006.01)

(52) U.S. Cl.
  CPC ................. *B60Q 3/04* (2013.01); *G01D 11/28* (2013.01); *G12B 11/04* (2013.01)

(58) Field of Classification Search
  CPC ........... B60Q 3/04; B60Q 3/004; B60Q 3/044; B60Q 3/046; B60Q 3/042; B60Q 3/048; G01D 11/28; G01D 11/02; G12B 11/04

(Continued)

(56) References Cited

U.S. PATENT DOCUMENTS 5,453,939 A  *  9/1995  Hoffman ................ B60K 35/00
                                                         340/438
6,318,872 B1    11/2001  Kato et al.
(Continued)

FOREIGN PATENT DOCUMENTS

CN    201284986    8/2009
DE    100 25 244    11/2000
(Continued)

OTHER PUBLICATIONS

Office Action dated May 12, 2015 in corresponding Japanese Application No. 2013-118143.
(Continued)

*Primary Examiner* — Anh Mai
*Assistant Examiner* — Arman B Fallahkhair
(74) *Attorney, Agent, or Firm* — Harness, Dickey & Pierce, P.L.C.

(57) ABSTRACT

A vehicular display apparatus is provided with an ambient-light luminous region that surrounds an outer periphery of a display region. An ambient light source emits light, which is then guided by an ambient-light guide body into an acrylic cylindrical body. The guided light is then outputted from a light output end face of the acrylic cylindrical body towards a light output direction. The light output end face forms the ambient-light luminous region. The vehicular display apparatus includes a light collection structure that collects an output light, which is outputted from the light output end face, towards the light output direction. Collecting the output light towards the light output direction enables the reduction of a light leakage to a direction different from the light output direction, improving an outputted luminance of the ambient-light luminous region.

19 Claims, 8 Drawing Sheets

(58) Field of Classification Search
USPC .... 362/23.01, 23.15, 23.02, 23.16, 489, 511, 362/23.18, 23.19, 23.09, 482, 245, 332, 362/334, 459
See application file for complete search history.

(56) References Cited

U.S. PATENT DOCUMENTS

| | | | |
|---|---|---|---|
| 7,207,117 B1 | 4/2007 | Cook et al. | |
| 7,347,160 B2 * | 3/2008 | Honma | B60K 37/02 116/286 |
| 7,553,037 B2 * | 6/2009 | Sullivan | G01D 11/28 362/23.15 |
| 7,665,857 B2 * | 2/2010 | Harada | G01D 11/28 116/288 |
| 8,483,907 B2 * | 7/2013 | Tarte | B60K 35/00 345/77 |
| 2002/0135994 A1 | 9/2002 | Ikarashi et al. | |
| 2009/0223436 A1 | 9/2009 | Werman et al. | |

FOREIGN PATENT DOCUMENTS

| | | |
|---|---|---|
| EP | 1 213 565 | 10/2005 |
| JP | 63-016975 | 5/1988 |
| JP | 10-332439 | 12/1998 |
| JP | 2004-325829 | 11/2004 |

OTHER PUBLICATIONS

Office Action dated Nov. 6, 2014 in corresponding European Application No. 14168073.6.

* cited by examiner

VEHICULAR DISPLAY APPARATUS

CROSS REFERENCE TO RELATED APPLICATION

The present application is based on Japanese Patent Application No. 2013-118143 filed on Jun. 4, 2013, the disclosure of which is incorporated herein by reference.

TECHNICAL FIELD

The present disclosure relates to a vehicular display apparatus, which is mounted in a vehicle while displaying vehicular information.

BACKGROUND ART

[Patent Literature 1] JP H10-332439 A

For instance, Patent Literature 1 describes a meter apparatus provided with an irradiation portion which outputs light in a region surrounding an outer periphery of a meter display portion that displaying information. The meter apparatus of Patent Literature 1 includes (i) a light source to emit light and (ii) a light guide body, which is made of transmissive material and transmits the light emitted from the light source to the irradiation portion. Such a configuration permits the meter apparatus to exhibit a luminous display image having a ring shape surrounding the meter display portion.

A vehicular display apparatus like the meter apparatus in Patent Literature 1 is mounted in a vehicle. Outdoor light entering a compartment of the vehicle may degrade the visibility of a luminous display image; this needs to improve the outputted luminance of the luminous display image. However, the light outputted from the irradiation portion may diffuse towards directions different from the light output direction in which the irradiation portion faces. Increasing excessively the outputted luminance of the luminous display image results in producing harmful light which leaks from the irradiation portion in a direction different from the light output direction. Then, such harmful light leaking from the irradiation portion may cause the luminous display image to be reflected in a rearview mirror or a side window of the vehicle.

SUMMARY

It is an object of the present disclosure to provide a vehicular display apparatus enabling a luminous region to output light with a high luminance while helping prevent the light luminous region from being reflected.

To achieve the above object, according to an example of the present disclosure, a vehicular display apparatus in a vehicle is provided with a luminous region that outputs luminance and surrounds a display region that displays vehicular information. The vehicular display apparatus includes a light source to emit light, a transmissive member made of light transmissive material, and a light collection device. The transmissive member receives the light emitted from the light source. The transmissive member has a light output face that outputs the light received from the light source as an output light to form the luminous region. The light collection device collects the output light from the light output face towards a light output direction in which the light output face faces.

An output light outputted from the light output face tends to diffuse in a direction different from the light output direction in which the light output face faces. However, under the above featured configuration, the light collection device amends a heading direction of the output light to meet the light output direction. Therefore, the vehicular display apparatus providing a luminous region outside of the outer periphery of the display region may raise an outputted luminance of the luminous region. Even in such a case, the above featured configuration helps prevent the increase of the harmful light which leaks in a direction different from the light output direction. That is, the above featured configuration helps prevent an occurrence of the situation where the luminous region is reflected in a rearview mirror or a side window of a vehicle.

In addition, collecting the output light towards the light output direction improves the outputted luminance of the light luminous region recognized by a viewer or driver. Thus, the vehicular display apparatus enables the luminous region to output light with a high luminance while helping prevent the luminous region from being reflected.

BRIEF DESCRIPTION OF THE DRAWINGS

The above and other objects, features, and advantages of the present disclosure will become more apparent from the following detailed description made with reference to the accompanying drawings. In the drawings.

DETAILED DESCRIPTION

The following describes embodiments of the present disclosure with reference to drawings. A component commonly provided in the embodiments is assigned with the same reference sign, eliminating repetition of explanation. When only part of the configuration of each embodiment is explained, the other part of the configuration may adopt those of the precedent embodiment previously explained. Partial combination between the embodiments may be possible with respect to not only a portion which is explicitly described in each embodiment, but also a portion which is not explicitly described if any trouble does not arise.

First Embodiment

Figure 1:
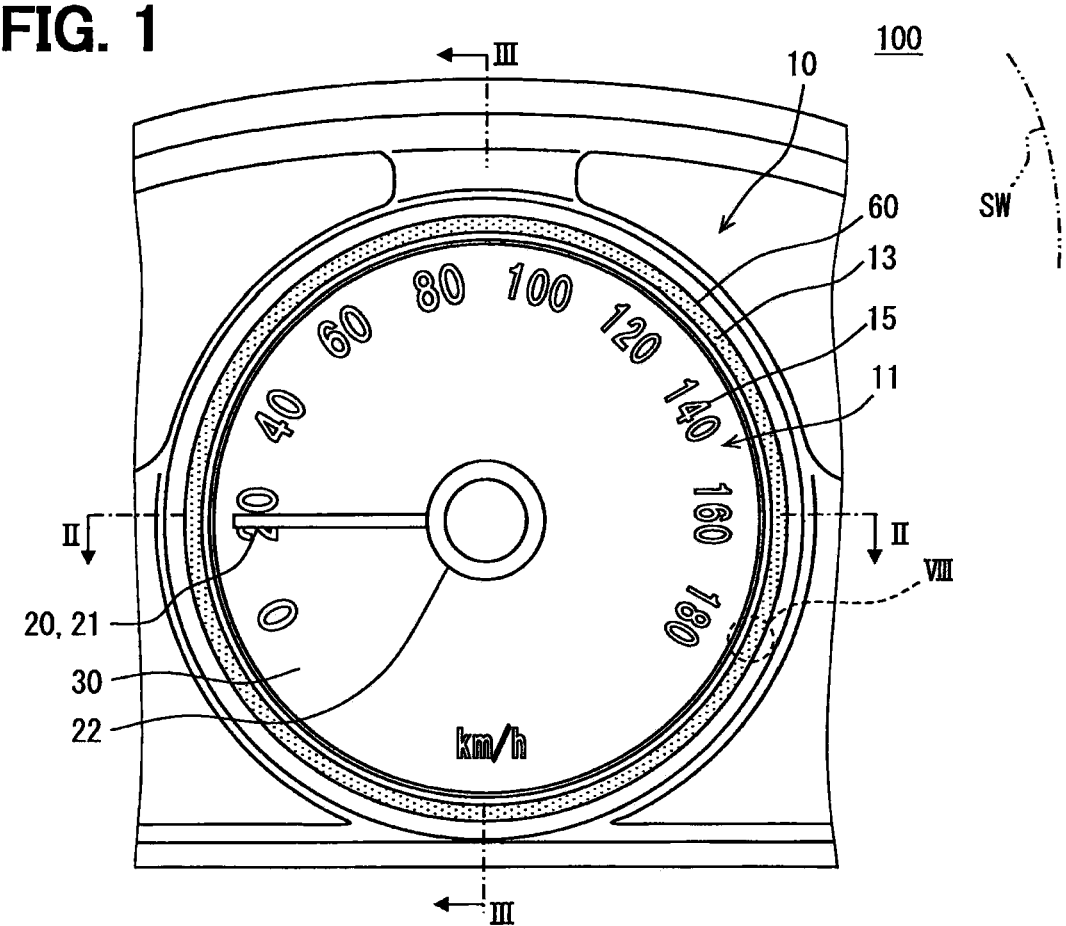
FIG. 1 is a front view of a combination meter according to a first embodiment of the present disclosure.

FIG. 1 illustrates a front view of a combination meter 100 in a vehicle, according to a first embodiment of the present disclosure. The combination meter 100 is contained in an instrument panel in a vehicle compartment of the vehicle and disposed such that the front side illustrated in FIG. 1 faces a driver seat.

(Basic Configuration)

The following explains a basic configuration of the combination meter 100 according to the first embodiment of the present disclosure. The combination meter 100 is a vehicular display apparatus, which is mounted in a vehicle while displaying a variety of information about the vehicle. The combination meter 100 includes several meters such as a speedometer 10, and other meters (unshown) of a tachometer, a water thermometer, a fuel gauge, and the like.

Figure 2:
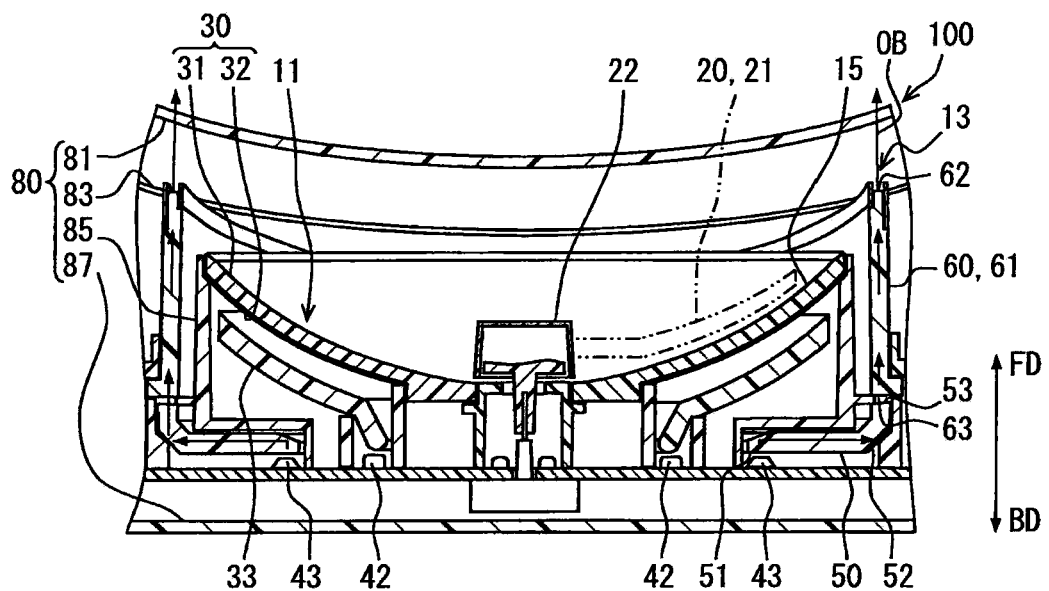
FIG. 2 is a cross-sectional view taken along the line II-II in FIG. 1 while illustrating a mechanical configuration of the combination meter according to the first embodiment.

The speedometer 10 displays as information a travel speed of the vehicle in a display region 11. The display of the speedometer 10 is configured by a combination of (i) the display region 11 and (ii) a circular ambient-light luminous region 13, which is provided to be outside of an outer periphery of the display region 11. The following defines the direction where the display region 11 demonstrates or outputs a display as a front direction FD or a display direction of the combination meter 100, and defines the direction opposite to the front direction as a back direction BD, as illustrated in FIG. 2. Further, both the front direction FD and the back direction BD are approximately equivalent to a front-back direction or longitudinal direction of the vehicle.

The display region 11 contains a display plate 30 and a pointer 20 which rotates along the surface of the display plate 30, as illustrated in FIGS. 1 and 2. The display plate 30 includes a transmissive plate 31 and a display sheet 32, and is located in the front direction FD of a display-light guide plate 33. The transmissive plate 31 and the display sheet 32 each have a disc-like shape using a light transmissive resin material such as a polycarbonate resin. The transmissive plate 31 is curved so as to protrude more towards the front direction as going closer to the outmost end in the radial direction of the dis-like shape. The display sheet 32 is located in the back direction BD of the transmissive plate 31, and is also curved to meet the transmissive plate 31. The display sheet 32 forms a luminous numeric portion 15 which light shielding printing is applied to; the luminous numeric portion 15 includes numeric characters of Arabic numerals for indicating a travel speed of the vehicle. The display-light guide plate 33 guides light emitted from a display-plate light source 42 mentioned later to the luminous numeric portion 15. The light guided by the display-light guide plate 33 transmits through the luminous numeric portion 15 of the display sheet 32 and then the transmissive plate 31 in order so that the light is outputted in the front direction FD to thereby provide a luminous display to the luminous numeric portion 15.

Figure 3:
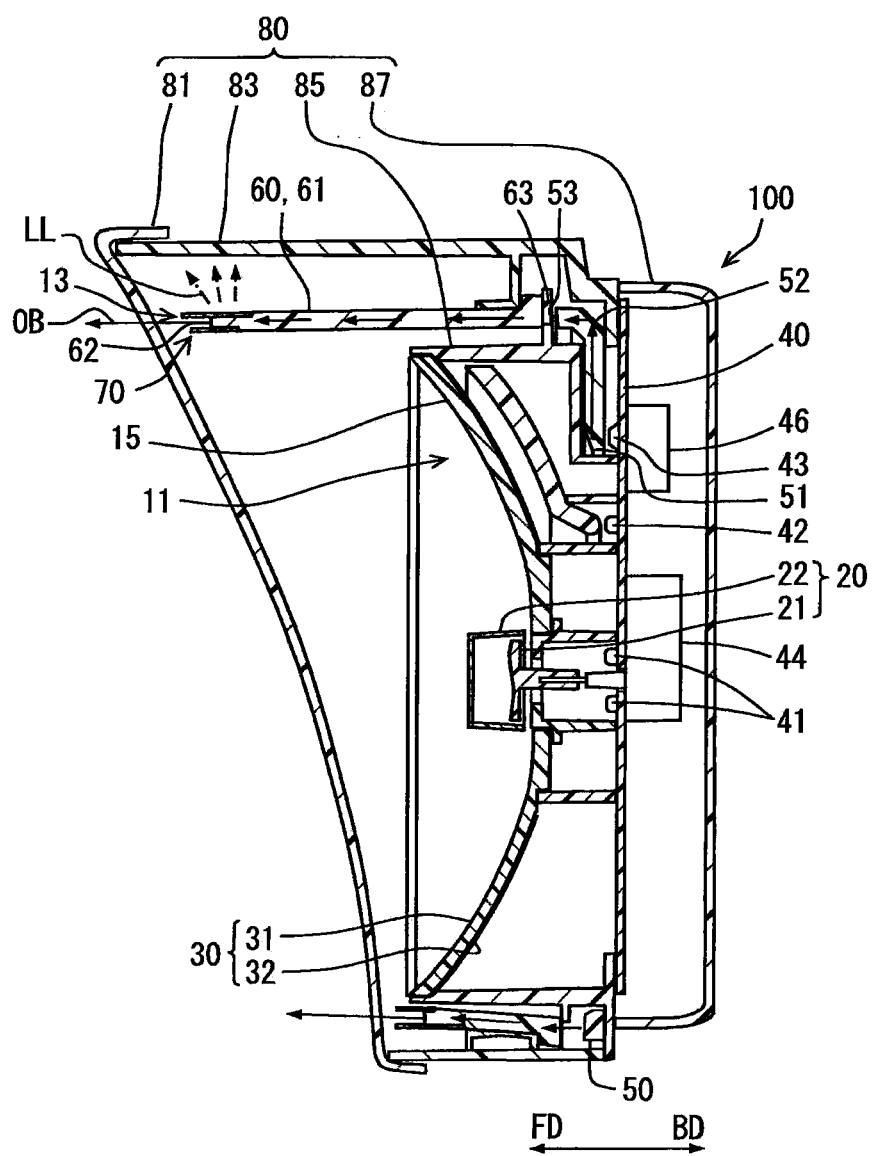
FIG. 3 is a cross-sectional view taken along the line III-III in FIG. 1 while illustrating a mechanical configuration of the combination meter according to the first embodiment.

The pointer 20 is configured by a combination of a pointer portion 21 made of light transmissive resin material, and a cap portion 22 made of light shielding resin material, as illustrated in FIGS. 1 to 3. The pointer portion 21 is extended in a radial direction of the display plate 30 from a central portion towards an outer periphery. The cap portion 22 is located at the central portion of the display plate 30 so as to cover an originating end portion of the pointer portion 21. The pointer portion 21 transmits the inputted light to the front side (FD) so as to provide a luminous display.

The ambient-light luminous region 13 is formed of an acrylic cylindrical body 60. The ambient-light luminous region 13 outputs light, which is guided by the ambient-light guide body 50, from the acrylic cylindrical body 60, thereby providing a luminous display. The acrylic cylindrical body 60 and the ambient-light guide body 50 each are made of light transmissive resin material such as an acrylic resin.

The acrylic cylindrical body 60 is formed in a cylindrical shape (also see FIG. 5), and is located to surround the outer periphery of the display region 11. The acrylic cylindrical body 60 is disposed to be substantially coaxial with the display plate 30. The acrylic cylindrical body 60 includes a transmissive wall portion 61, a light input end face 63, and a light output end face 62. The transmissive wall portion 61 is projected along the front direction FD, outside of the outer periphery of the display region 11. The length in the front direction FD of the transmissive wall portion 61 becomes larger as going from the lower side towards the upper side in an up-down direction orthogonal to the front direction FD (see FIGS. 3 and 5).

The light input end face 63 is located at a back-side end face of the transmissive wall portion 61 along the front direction FD and the back direction BD; the back-side end face is one of both the end faces towards the back direction BD. The light input end face 63 faces towards the back direction BD, opposing the ambient-light guide body 50. The light input end face 63 receives light outputted from the ambient-light guide body 50, thereby permitting the light to enter the transmissive wall portion 61. The light output end face 62 is located at a front-side end face of the transmissive wall portion 61 along the front direction FD and the back direction BD; the front-side end face is one of both the end faces towards the front direction FD. The light output end face 62 is formed in a circular-ring shape along the outer periphery of the display region 11, and outputs light entering the transmissive wall portion 61 via the light input end face 63, thereby providing the ambient-light luminous region 13.

The ambient-light guide body 50 is formed in a partial-disc-like shape and is located in the back direction BD of the acrylic cylindrical body 60. The ambient-light guide body 50 includes an ambient-light input portion 51, an ambient-light reflective portion 52, and an ambient-light output portion 53. The ambient-light input portion 51 is formed in an end of the inner periphery of the ambient-light guide body 50. The ambient-light input portion 51 is located in the front direction FD of the ambient light source 43 mentioned later; the ambient-light input portion permits the light emitted by the ambient light source 43 to enter the ambient-light guide body 50, while reflecting the entering light towards the outer periphery of the ambient-light guide body 50. The ambient-light reflective portion 52 is formed in an end of the outer periphery of the ambient-light guide body 50. The ambient-light reflective portion 52 is in an inclined shape so as to go towards the outer periphery as going towards the front direction FD; thereby, the light reflected towards the outer periphery by the ambient-light input portion 51 is further reflected towards the front direction FD. The ambient-light output portion 53 is formed in the front direction FD of the ambient-light reflective portion 52 in the end of the outer periphery of the ambient-light guide body 50. The ambient-light output portion 53 opposes the light input end face 63 in the front direction FD. The ambient-light output portion 53 outputs the light, which is reflected towards the front direction FD by the ambient-light reflective portion 52, towards the light input end face 63.

The display plate 30, the pointer 20, the acrylic cylindrical body 60, and the ambient-light guide body 50 are contained in a housing 80 indicated in FIGS. 2 and 3. The housing 80 is constructed by assembling a front glass 81, a front case 83, a rear case 85, and a rear cover 87. The housing 80 contains the respective elements 20, 30, 60, 50, thereby protecting them from dusts in atmosphere.

Figure 4:
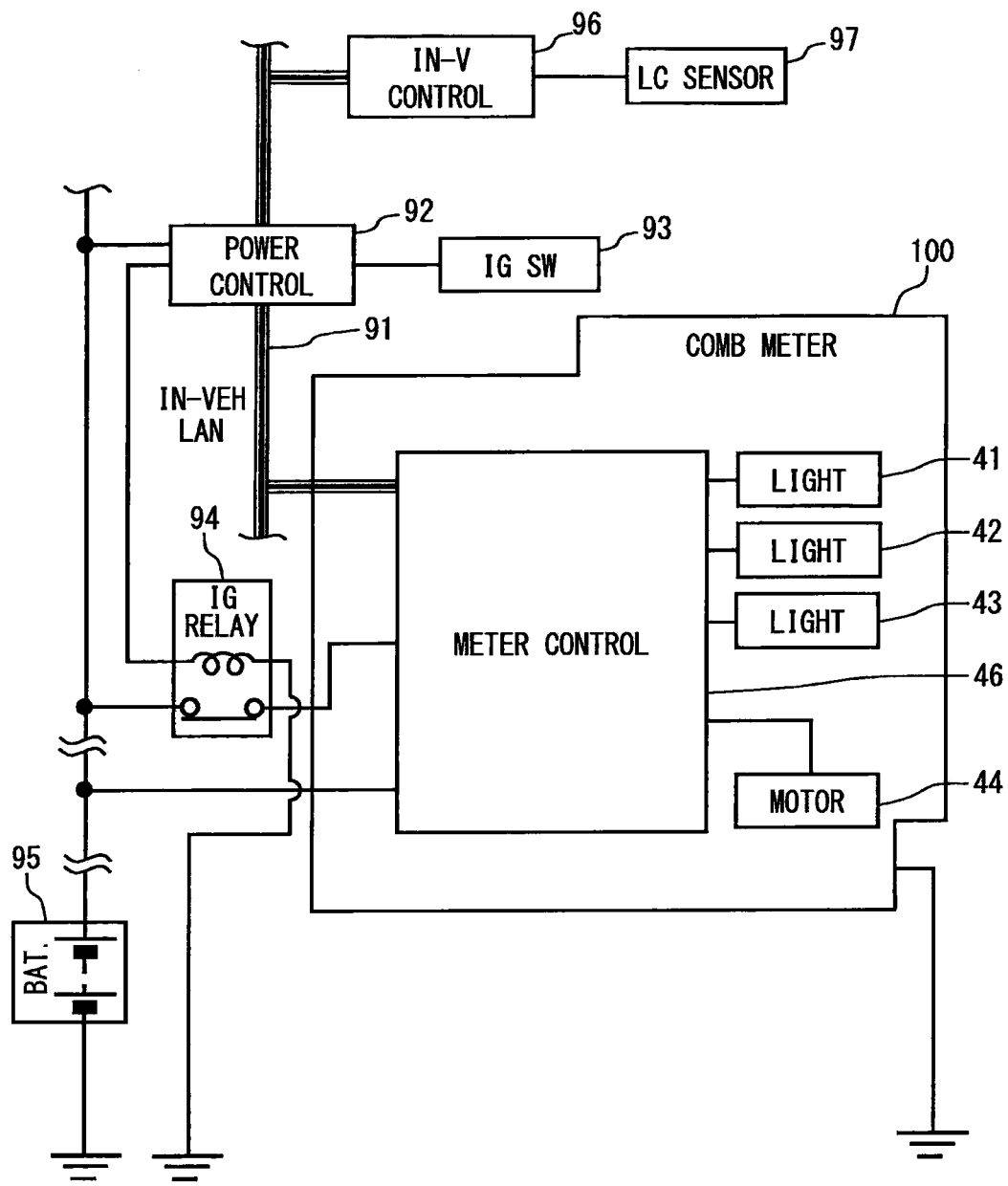
FIG. 4 is a block diagram illustrating an electrical configuration of the combination meter according to the first embodiment.

The following explains an electrical configuration of the combination meter 100 with reference to FIGS. 3 and 4. The combination meter 100 is mounted in a circuit board 40, and includes the electrical components such as a pointer light source 41, a display plate light source 42, an ambient light source 43, a stepper motor 44, and a meter control circuit 46.

The pointer light source 41, the display plate light source 42, and the ambient light source 43 are configured by several light emitting diodes, for instance. The pointer light source 41 permits the pointer portion 21 to be luminous and emits red light, for instance. In contrast, the display plate light source 42 permits the luminous numeric portion 15 to be luminous and emits white light, for instance. Further, the ambient light source 43 permits the ambient-light luminous region 13 to be luminous and emits blue light, for instance. Each light source 41 to 43 is connected to the meter control circuit 46, and emits light based on drive signals outputted from the meter control circuit 46.

The stepper motor 44 has a mechanism which rotates the pointer 20. The stepper motor 44 is attached with a pointer portion 21 at a rotation axis. The stepper motor 44 is connected to the meter control circuit 46, and rotates the pointer 20 based on drive signals outputted from the meter control circuit 46.

The meter control circuit 46 includes a microcomputer which operates based on programs. The meter control circuit 46 is connected with an in-vehicle local area network (LAN) 91, an external battery 95, and an ignition relay 94. Furthermore, the in-vehicle LAN 91 is connected to an in-vehicle control apparatus 96 and a power control apparatus 92.

The in-vehicle control apparatus 96 is connected with a light control sensor 97. The light control sensor 97 is installed in the instrument panel of the vehicle to detect a luminance of vicinity of the vehicle through a windshield and output it. The in-vehicle control apparatus 96 switches between the ON state and OFF state of a headlight depending on the detected luminance in vicinity of the vehicle based on the output of the light control sensor 97. In addition, the in-vehicle control apparatus 96 outputs the information (hereinafter "state information of the headlight") which indicates the ON state and OFF state of the headlight to the in-vehicle LAN 91. In contrast, the power control apparatus 92 is connected with the ignition switch 93. The power control apparatus 92 in the in-vehicle LAN 91 detects a depression manipulation to the ignition switch 93 by the driver, applies voltage to the ignition relay 94, to switch the ignition relay 94 into a current-applied state.

The meter control circuit 46 acquires, as vehicular information outputted in the in-vehicle LAN 91, the information indicating a travel speed and the state information of the headlight. The meter control circuit 46 outputs a control signal based on the information on the travel speed of the vehicle acquired via the in-vehicle LAN 91 to the stepper motor 44, thereby driving a rotation axis to which the pointer portion 21 is attached. In addition, the meter control circuit 46 controls a luminance of each light source 41 to 43 by outputting a drive signal to each light source 41 to 43.

Under the above configuration, the ignition of the vehicle is turned into the ON state based on the input to the ignition switch 93; the ignition relay 94 receives a voltage to switch into a current-applied state. The combination meter 100 starts a light emitting control of each light source 41 to 43 in FIG. 3 and a rotation control of the stepper motor 44 so as to permit the speedometer 10 to provide a pointer display (see FIG. 1) depending on a travel speed of the vehicle.

(Featured Configuration)

The following explains a configuration of the light collection structure 70 and an operation of the meter control circuit 46, which are featured configurations of the combination meter 100 according to the first embodiment.

Figure 5:
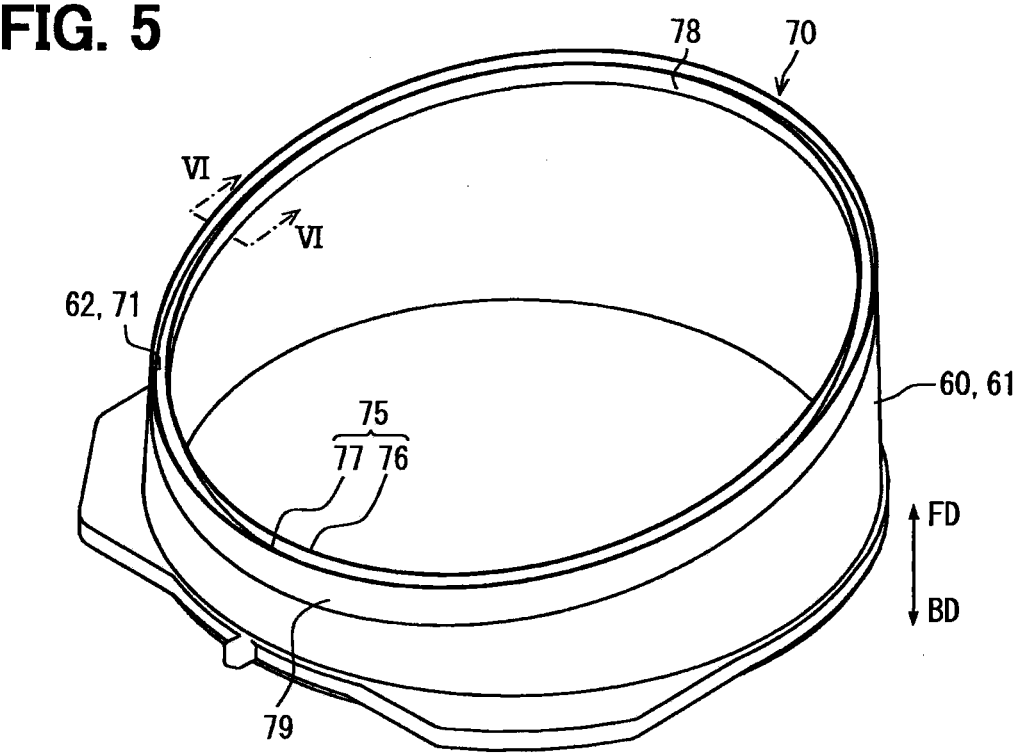
FIG. 5 is a perspective view of an acrylic cylindrical body and a light collection structure.
Figure 6:
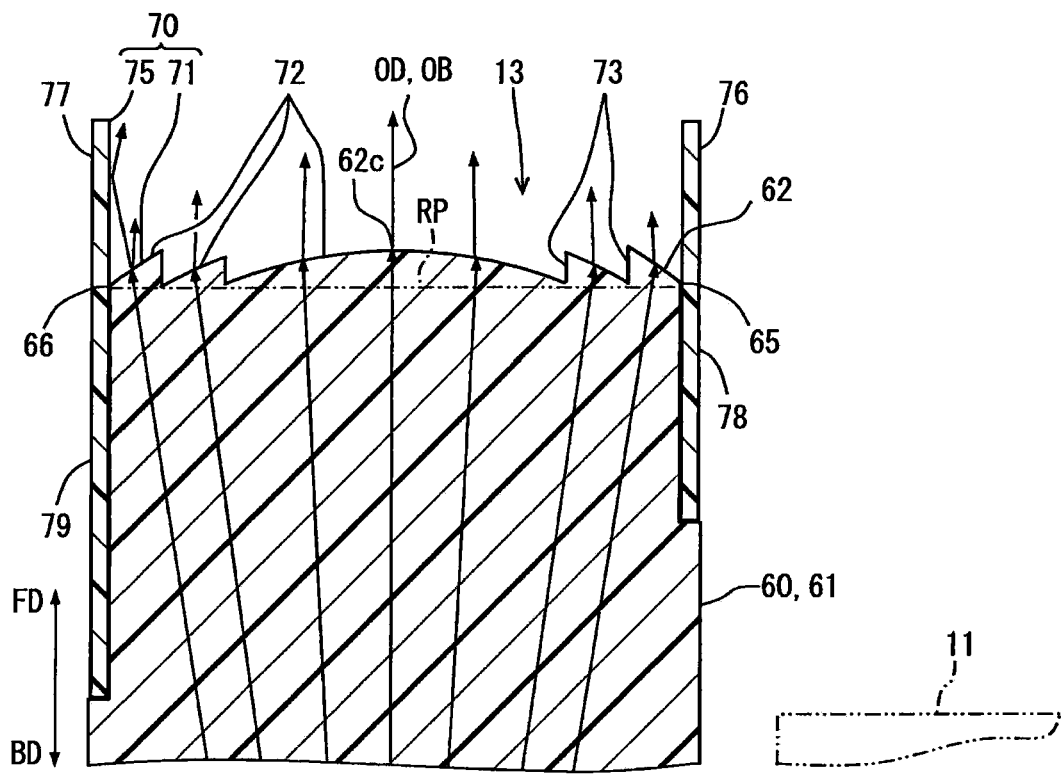
FIG. 6 is a cross-sectional view taken along the line VI-VI in FIG. 5 while enlarging the light collection structure.

The light collection structure 70 is formed in a circular-ring shape along the light output end face 62 as illustrated in FIGS. 5 and 6. The light collection structure 70 collects output light (or output light beam) OB (see FIGS. 2 and 3) outputted from the light output end face 62 towards the light output direction OD to which a central portion 62*c* of the light output end face 62 heads or faces, as indicated in FIG. 6. The light output direction OD in the first embodiment is defined as a direction of a normal line of the central portion 62*c* of the light output end face 62 in the cross-section along a radial direction of the acrylic cylindrical body 60 in FIG. 6. In other words, the direction of the normal line is the direction in which the central portion 62*c* faces. The light collection structure 70 includes (i) a refractive face 71 formed to be integrated into the light output end face 62, and (ii) a light shielding wall 75 standing to surround the light output end face 62.

The refractive face 71 is integrated with the light output end face 62 so as to form the ambient-light luminous region 13. The refractive face 71 forms a convex lens portion 72 to be convex that is protruding towards the light output direction OD in a cross-section along a radial direction of the acrylic cylindrical body 60. The convex lens portion 72 is divided into a plurality of sub-regions, which are disposed in a row along a reference plane RP orthogonal to the light output direction OD. The neighboring sub-regions each are extended along a peripheral direction of the acrylic cylindrical body 60, and linked via connection face portions 73 along the light output direction OD. The above configuration permits the refractive face 71 to exhibit a Fresnel lens shape that refracts the light guided by the transmissive wall portion 61 into the light output direction OD. Thus, the refractive action or effect, which unifies the heading direction of the output light OB into the light output direction OD, enables the refractive face 71 to collect the output light OB into the light output direction OD.

The light shielding wall 75 is made of a resin material providing a light shielding effect such as polypropylene resin, ABS resin. The light shielding wall 75 is molded to be integrated with the acrylic cylindrical body 60 using either two color molding or insert molding. The light shielding wall 75 includes an inner peripheral shielding wall portion 76, an outer peripheral shielding wall portion 77, an inner peripheral auxiliary wall portion 78, and an outer peripheral auxiliary wall portion 79.

The acrylic cylindrical body 60 or the light shielding wall 75 having a circular-ring shape has an inner periphery and an outer periphery opposite to the inner periphery. The inner periphery is adjacent to the display region 11 such that the inner periphery intervenes between the display region 11 and the light output end face 62, or the inner periphery is closer to the display region 11 than the light output end face 62. The outer periphery is farther from the display region 11 than the light output end face 62. The inner peripheral shielding wall portion 76 is arranged in the inner periphery adjacent to the display region 11 to be in between the display region 11 and the light output end face 62, and is standing from a boundary portion 65 which adjoins or faces the light output end face 62 in the inner periphery. In contrast, the outer peripheral shielding wall portion 77 is arranged in the outer periphery opposite to the inner periphery via the light output end face 62, and is standing from the boundary portion 66 which adjoins or faces the light output end face 2 in the outer periphery. The above inner peripheral shielding wall portion 76 and the outer peripheral shielding wall portion 77 function as obscuring light (blocking light) that separates or diffuses from the light output direction OD of the output light OB. The light shielding effect enables the light shielding wall 75 to collect the output light OB into the light output direction OD.

The inner peripheral auxiliary wall portion 78 is extended from the inner peripheral shielding wall portion 76 towards the back direction BD of the light output end face 62. In contrast, the outer peripheral auxiliary wall portion 79 is extended from the outer peripheral shielding wall portion 77 towards the back direction BD of the light output end face 62. The length of the outer peripheral auxiliary wall portion 79 along the light output direction OD is provided to be longer than the length of the inner peripheral auxiliary wall portion 78 in the light output direction OD. The above inner peripheral auxiliary wall portion 78 and the outer peripheral auxiliary wall portion 79 function as obscuring light LL (refer to FIG. 3) which is going to leak from a portion close to the light output end face 62 in the transmissive wall portion 61.

Figure 7:
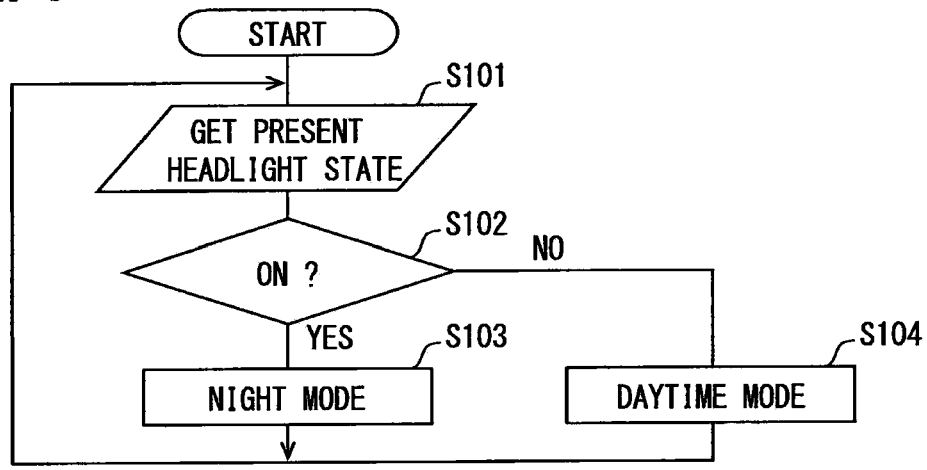
FIG. 7 is a flowchart diagram illustrating a process by a meter control circuit to control an outputted luminance of an ambient-light luminous region.

Furthermore, the meter control circuit 46 in FIG. 4 adjusts a light amount emitted from the ambient light source 43 depending on a luminance in vicinity of the vehicle, thereby controlling a luminance of the ambient-light luminous region 13. The following explains a process by the meter control circuit 46 with reference to FIG. 7 in order to realize a luminance control of the ambient-light luminous region 13 (refer to FIG. 1). The process indicated in FIG. 7 is started by the meter control circuit 46 based on the ignition of the vehicle being turned into the ON state. It is further noted that a flowchart or processing of the process in the present application includes sections (also referred to as steps), which are represented, for instance, as S101. Further, each section can be divided into several sections while several sections can be combined into a single section. Furthermore, each of thus configured sections can be referred to as a module, device, or means and achieved not only (i) as a software section in combination with a hardware unit (e.g., computer), but also (ii) as a hardware section (e.g., integrated circuit, hard-wired logic circuit), including or not including a function of a related apparatus. Further, the hardware section may be inside of a microcomputer.

At S101, headlight state information is acquired via the in-vehicle LAN 91 as light-dark information that indicates a luminance in vicinity of the vehicle. The processing then proceeds to S102. At S102, it is determined whether the headlight is in the ON state based on the headlight state information acquired at S101. The affirmative determination at S102 advances the processing to S103. In contrast, the negative determination at S102 advances the processing to S104.

At S103, the electric-current value of a drive signal outputted to the ambient light source 43 is set to a value associated with a night mode. The electric-current value in the night mode is a value adjusted previously so as to permit the ambient-light luminous region 13 to exhibit a luminous intensity of 20 candela (cd), for instance. Thus the luminance in the ambient-light luminous region 13 is reduced according to the darkness in the vicinity of the vehicle.

At S104, the electric-current value of a drive signal outputted to the ambient light source 43 is set to a value associated with a daytime mode. The electric-current value in the daytime mode is a value greater than the electric-current value in the night mode so as to permit the ambient-light luminous region 13 to exhibit a luminous intensity of 100 cd. Thus the luminance in the ambient-light luminous region 13 is increased according to the lightness in the vicinity of the vehicle.

As explained above, according to the first embodiment, even if the output light OB is going to diffuse or spread in a direction different from the light output direction OD, the heading direction of the output light OB is amended by the light collection structure 70 towards a direction to meet the light output direction OD. Therefore, even if the luminance of the ambient-light luminous region 13 is increased, the increase of harmful light which leaks to the direction different from the light output direction OD is suppressed. This configuration can help prevent an occurrence of the situation where the ambient-light luminous region 13 is reflected in a rearview mirror or a side window of the vehicle. In addition, collecting the output light OB towards the light output direction OD improves the outputted luminance of the ambient-light luminous region 13 recognized by a viewer. According to the above configuration, the combination meter 100 helps prevent the ambient-light luminous region 13 from being reflected to a rearview mirror or side window of the vehicle while permitting the ambient-light luminous region 13 to output a high luminance.

Further, the first embodiment provides the refractive effect by the refractive face 71 of the light collection structure 70, and the light shielding effect by the light shielding wall 75 of the light collection structure 70; this configuration helps prevent the increase of the harmful light which leaks in a direction different from the light output direction OD. As explained above, the light collection structure 70 including both the refractive face 71 and the light shielding wall 75 improves the certainty of the effect that suppresses the ambient-light luminous region 13 from being reflected.

In addition, according to the first embodiment, the convex lens portion 72 may refract suitably the whole of the output light OB towards the light output direction OD. Therefore, the refractive face 71 can improve the luminance of the ambient-light luminous region 13 with the light refracted towards the light output direction OD.

Further, the first embodiment provides the inner peripheral shielding wall portion 76 and the outer peripheral shielding wall portion 77 in the inner periphery and the outer periphery of the light output end face 62, respectively. In addition, the refractive face 71 is provided to have a Fresnel lens shape to decrease a thickness of the refractive face 71 in the light output direction OD. The above configuration maintains the refractive face 71 such that the refractive face 71 does not project significantly from the light shielding wall 75. Thus, the light shielding wall 75 may enclose the periphery of the refractive face 71 certainly. As mentioned above, the light shielding wall 75 enclosing certainly the refractive face 71 serving as the light output end face 62 can demonstrate certainly the light shielding function which obscures or blocks out the light advancing in a direction different from the light output direction OD. This can certainly prevent the light luminous region from being reflected in a rearview mirror or a side window.

Further, in the first embodiment, the refractive face 71 integrated with the light output end face 62 exhibits a refractive effect that is applied to the whole of the output light OB. Therefore, the leakage of the output light OB from the ambient-light luminous region 13 is certainly reduced by the refractive effect of the refractive face 71. Therefore, reflecting the ambient-light luminous region 13 can be avoided certainly.

Further, in the first embodiment, the auxiliary wall portions 78 and 79 extended from the respective shielding wall portions 76 and 77 in the back direction BD can avoid the leakage of the light from within the transmissive wall portion 61 close to the light output end face 62. This reduces the light LL which leaks from the transmissive wall portion 61 so as to prevent the ambient-light luminous region 13 being reflected to a rearview mirror etc. still more certainly.

Further, in the first embodiment, adjusting a light amount emitted from the ambient light source 43 depending on a luminance in vicinity of the vehicle permits the ambient-light luminous region 13 to appear with a luminous intensity according to the lightness in vicinity of the vehicle. In addition, an unnecessary increase in the luminance of the ambient-light luminous region 13 is suppressed to easily prevent the ambient-light luminous region 13 from being reflected. Thus, the combination meter 100 can realize accurately the situation, where the ambient-light luminous region 13 is permitted to appear with a high luminance, while helping prevent the reflection of the ambient-light luminous region 13, depending on a luminance in vicinity of the vehicle.

Further, in the first embodiment, the ambient-light luminous region 13 may be also referred to just as a luminous region. The ambient light source 43 may be also referred to just as a light source. In addition, the meter control circuit 46 may be referred to as each of a light-dark acquisition section, device, or means, and a light source control section, device, or means. The acrylic cylindrical body 60 and the ambient-light guide body 50 may be referred to as a transmissive member. Furthermore, the light output end face 62 may be also referred to as a light output face. The light collection structure 70 may be also referred to as a light collection device or means. The light shielding wall 75 may be referred to as a standing wall. The inner peripheral shielding wall portion 76 may be also referred to as an inner peripheral wall portion. In addition, the outer peripheral shielding wall portion 77 may be referred to as an outer peripheral wall portion. The inner peripheral auxiliary wall portion 78 and the outer peripheral auxiliary wall portion 79 each may also referred to as a back-extension wall portion. The combination meter 100 may be also referred to as a vehicular display apparatus.

Second Embodiment

Figure 8:
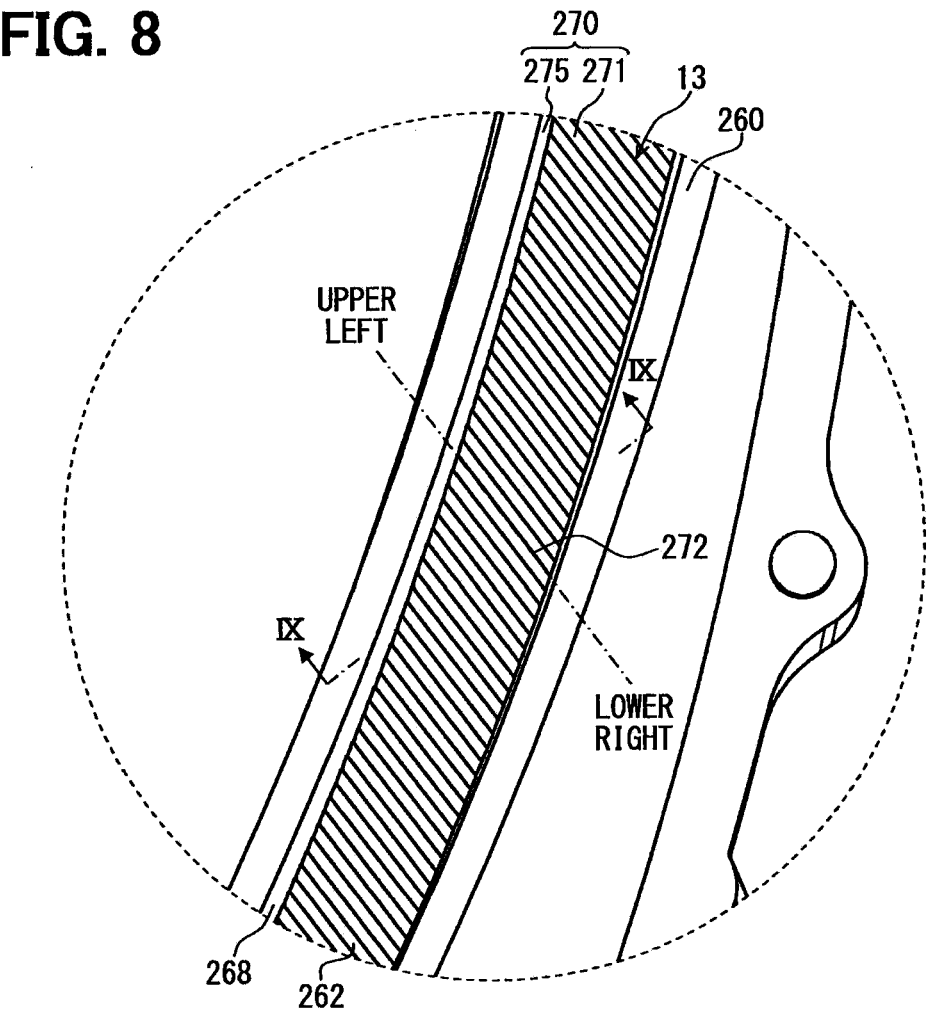
FIG. 8 is an enlarged view of enlarging a portion equivalent to the region VIII in FIG. 1 in the combination meter according to a second embodiment of the present disclosure.
Figure 9:
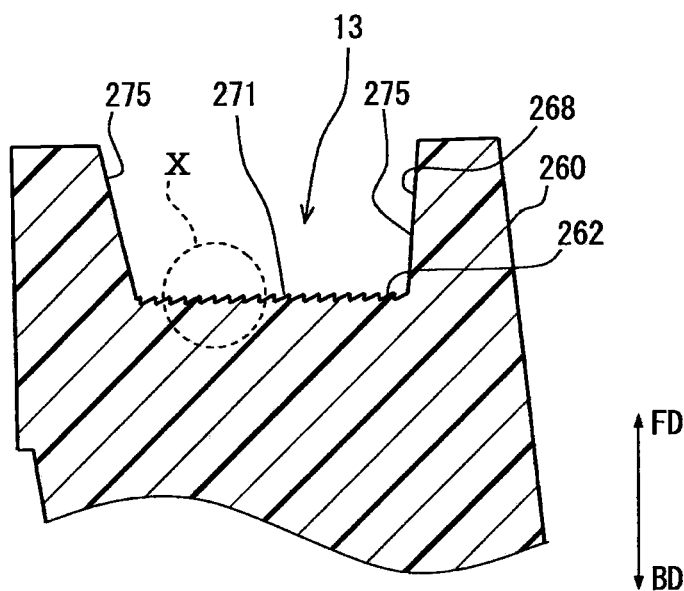
FIG. 9 is a cross-sectional view taken along the line IX-IX in FIG. 8 while explaining a Fresnel shape of a light output face.
Figure 10:
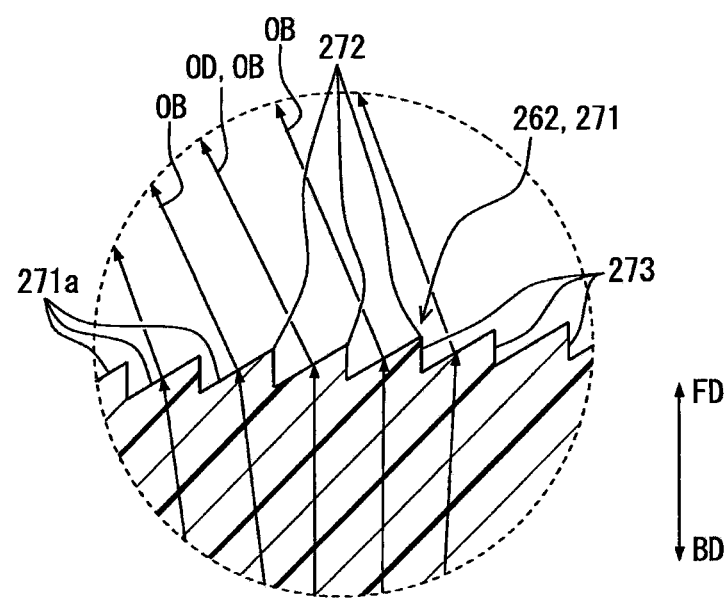
FIG. 10 is an enlarged view of enlarging the region X in FIG. 9.

The following explains a second embodiment that is a modification of the first embodiment with reference to FIGS. 8 to 10. The secondary embodiment provides an acrylic cylindrical body 260 that includes a concave groove 268 on one end face facing the front direction FD. The concave groove 268 is formed in a circular-ring shape along the peripheral direction of the acrylic cylindrical body 260; the concave grove 268 includes a bottom face providing a light output end face 262. A light collection structure 270 provided in the acrylic cylindrical body 260 includes a refractive face 271 which forms the ambient-light luminous region 13, and a light shielding wall 275 that is formed of an inner peripheral wall of the concave groove 268.

The refractive face 271 is formed to be integrated with the light output end face 262. The refractive face 271 is divided into a plurality of slope portions 271a. The respective slope portions 271a are mutually linked by connection face portions 273 that are along an axial direction of the acrylic cylindrical body 260. Each slope portion 271a is arranged to be inclined against each connection face portion 273; thus, a linear intersecting line 272 is defined as a line formed between each slope portion 271a and each connection face portion 273. Such linear intersecting lines 272 are approximately parallel with the line SW in FIG. 1 indicating a side window of the vehicle, and are illustrated in FIG. 8 to be inclined with a small angle anticlockwise or to appear as straight lines from upper left to lower right. The Fresnel shape of the above light output end face 262 enables the refractive face 271 to refract the light inside of the acrylic cylindrical body 260 towards the light output direction OD being the direction of the normal line of each slope portion 271a. Thus, the refractive face 271 collects the output light OB towards the light output direction OD to reduce an amount of output light arriving at the side window SW.

Even in the second embodiment, the light collection structure 270 including the refractive face 271 provides a refraction effect to collect the output light OB towards the light output direction OD. This enables the reduction of the light which leaks in a direction different from the light output direction OD, and, simultaneously, the improvement of a luminance of the ambient-light luminous region 13. Therefore, the second embodiment can help prevent the ambient-light luminous region 13 from being reflected to the side window SW (refer to FIG. 1) while permitting the ambient-light luminous region 13 to provide a high luminance.

Further, in the second embodiment, the acrylic cylindrical body 260 and the ambient-light guide body 50 (refer to FIG. 3) may be also referred to as a transmissive member. Furthermore, the light output end face 262 may be also referred to as a light output face. The light collection structure 270 may be also referred to as a light collection device or means. The light shielding wall 275 may be referred to as a standing wall.

Third Embodiment

Figure 11:
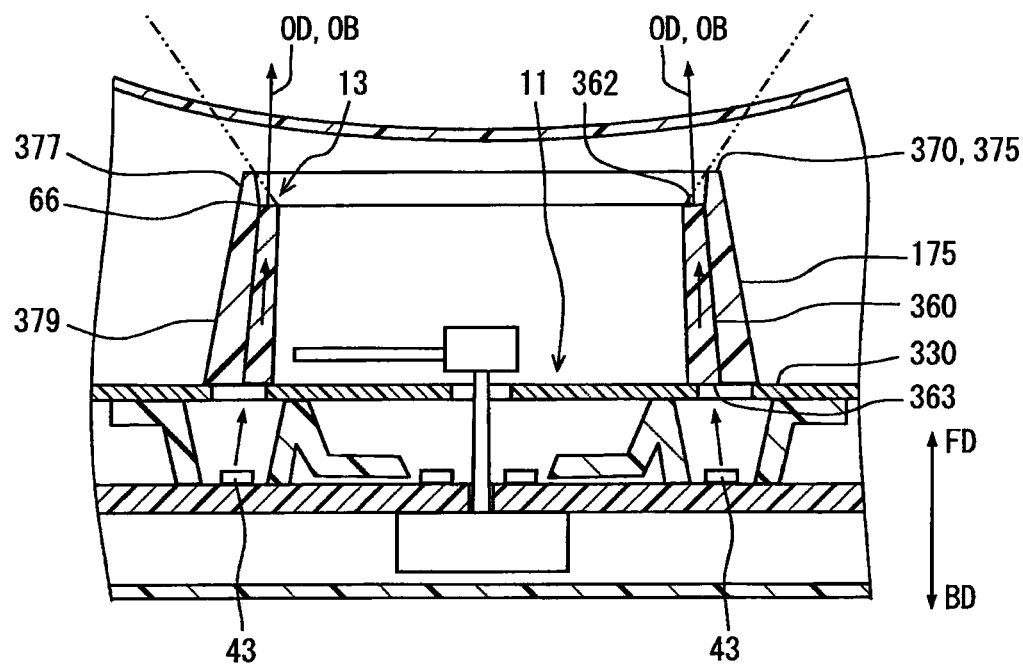
FIG. 11 is a mechanical configuration of a combination meter according to a third embodiment of the present disclosure.

The following explains a third embodiment that is another modification of the first embodiment with reference to FIG. 11. The third embodiment eliminates a constituent element equivalent to the ambient-light guide body 50 (refer to FIG. 2) of the first embodiment. That is, an acrylic cylindrical body 360 receives light directly from an ambient light source 43, which is located in back direction BD of the acrylic cylindrical body 360, via a light input end face 363 that the ambient light source 43 opposes.

In addition, the outer periphery of the acrylic cylindrical body 360 is surrounded by a black light shielding cylindrical body 175. The light shielding cylindrical body 175 is formed of light-shielding resin material such as polypropylene resin, ABS resin to be cylindrical; the light shielding cylindrical body 175 encircles the acrylic cylindrical body 360. The length in an axial direction of the light shielding cylindrical body 175 is provided to be longer than that in an axial direction of the acrylic cylindrical body 360. The light shielding cylindrical body 175 forms a light shielding wall 375 serving as a light collection structure 370 of the third embodiment.

The light shielding wall 375 includes an outer peripheral shielding wall portion 377 and an outer peripheral auxiliary wall portion 379. The outer peripheral shielding wall portion 377 is located to be adjacent to the light output end face 362 such that the light output end face 362 is sandwiched between the outer peripheral shielding wall portion 377 and the display region 11; the outer peripheral shielding wall portion 377 stands towards the light output direction OD from a boundary portion 66 which adjoins or faces the light output end face 362. The outer peripheral shielding wall portion 377 provides a function which obscures the light proceeding in a direction separate from the light output direction OD, which is specified to be the direction of the normal line of the light output end face 362, of the output light OB. The light shielding effect enables the light shielding wall 375 to collect the output light OB into the light output direction OD.

The outer peripheral auxiliary wall portion 379 is extended from the outer peripheral shielding wall portion 377 in the back direction BD of the light output end face 362. The bottom tip of the outer peripheral auxiliary wall portion 379 reaches a display plate 330. The outer peripheral auxiliary wall portion 379 provides a function which obscures the light which leaks from the side wall face of the acrylic cylindrical body 360.

Even in the third embodiment, the light shielding effect by the light shielding wall 375 collects the output light OB towards the light output direction OD in which the light output end face 362 faces. This can reduce the light which leaks towards an outside of the light shielding cylindrical body 175; the luminance of the ambient-light luminous region 13 becomes difficult to be visible from an outside of the light shielding cylindrical body 175 (see the two-dot chain line of FIG. 11). Therefore, the ambient-light luminous region 13 can be suppressed from being reflected in the side window SW (refer to FIG. 1).

In addition, the third embodiment provides a design where the inner periphery of the light shielding cylindrical body 175 provides a luminous display using the acrylic cylindrical body 360. Therefore, although the design is provided such that the display region 11 is surrounded by the light shielding cylindrical body 175 to prevent the leakage of the light, the design can reduce a sense of limitation to a viewer.

Further, in the third embodiment, the acrylic cylindrical body 360 may be referred to as a transmissive member. The light output end face 362 may be also referred to as a light output face. The light collection structure 370 may be also referred to as a light collection device or means. The light shielding wall 375 may be referred to as a standing wall. The outer peripheral shielding wall portion 377 may be referred to as an outer peripheral wall portion. The outer peripheral auxiliary wall portion 379 may be also referred to as a back-extension wall portion.

Fourth Embodiment

Figure 12:
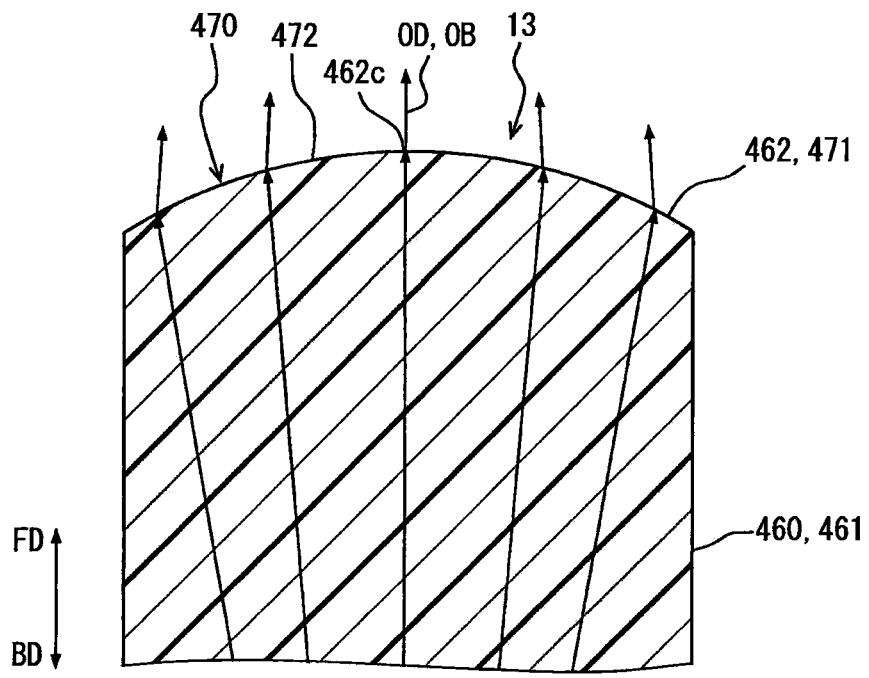
FIG. 12 is a diagram illustrating a modification example of FIG. 6 according to a fourth embodiment of the present disclosure.

The following explains a fourth embodiment that is another modification of the first embodiment with reference to FIG. 12. The fourth embodiment provides a light collection structure 470 including a refractive face 471 formed to be integrated with a light output end face 462. The light collection structure 470 eliminates a constituent element equivalent to the light shielding wall 75 (refer to FIG. 6) of the first embodiment. With reference to FIG. 12, a refractive face 471 of the light collection structure 470 is explained in detail.

The refractive face 471 forms a convex lens portion 472 to be convex that is protruded in the light output direction OD in a cross-section along a radial direction of an acrylic cylindrical body 460. The convex lens portion 472 is provided smoothly to range continuously from a boundary portion in an inner periphery to a boundary portion in an outer periphery. The refractive face 471 refracts the light guided by a transmissive wall portion 461 towards the light output direction OD. The light output direction OD in the fourth embodiment is defined, like in the first embodiment, as a direction of a normal line of a central portion 462c of a light output end face 462 in the cross-section along a radial direction. In other words, the direction of the normal line is the direction in which the central portion 462c faces. The refractive face 471 provides a refractive effect which collects the output light OB towards the light output direction OD so as to collect the output light OB, which is going to diffuse, towards the light output direction OD.

Further, in the fourth embodiment, the light collection structure 470 including the refractive face 471 provides a refraction effect to collect the output light OB towards the light output direction OD. This enables the reduction of the light which leaks in a direction different from the light output direction OD, and, simultaneously, the improvement of a luminance of the ambient-light luminous region 13. This configuration enables the ambient-light luminous region 13 to output light with a high luminance while helping prevent the ambient-light luminous region 13 from being reflected.

Further, in the fourth embodiment, the acrylic cylindrical body 460 and the ambient-light guide body 50 (refer to FIG. 3) may be also referred to as a transmissive member. The light output end face 462 may be also referred to as a light output face. The light collection structure 470 may be also referred to as a light collection device or means.

Fifth Embodiment

Figure 13:
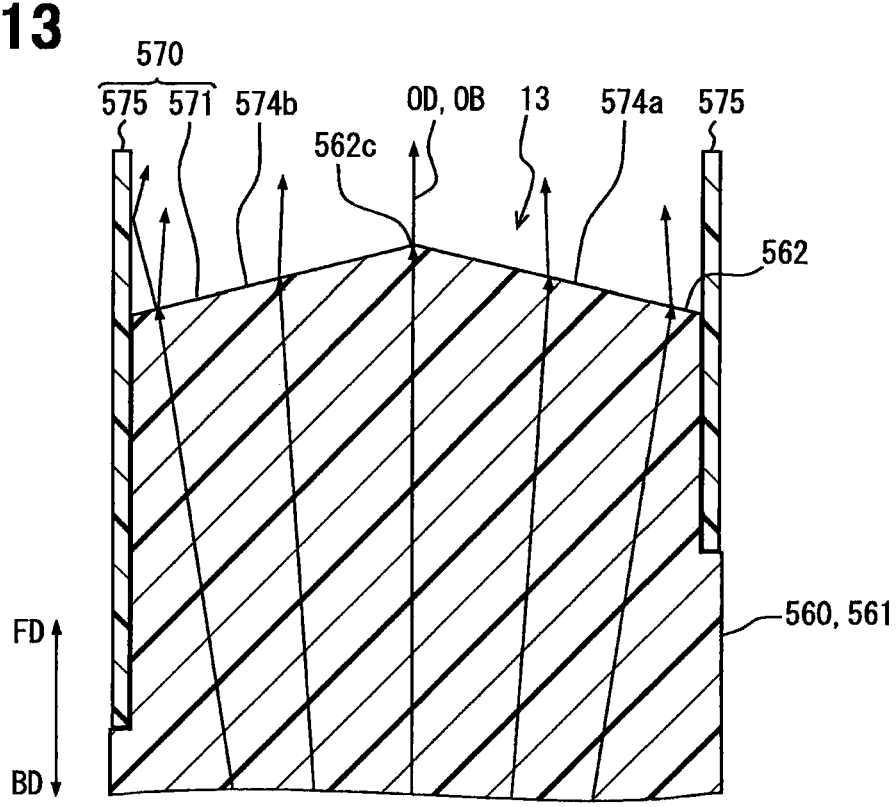
FIG. 13 is a diagram illustrating another modification example of FIG. 6 according to a fifth embodiment of the present disclosure.

The following explains a fifth embodiment that is another modification of the first embodiment with reference to FIG. 13. The fifth embodiment provides a light collection structure 570 that includes a light shielding wall 575 substantially identical to the light shielding wall 75 (refer to FIG. 6) of the first embodiment, and a refractive face 571 formed to be integrated into a light output end face 562. With reference to FIG. 13, the light collection structure 570 will be explained in detail.

The refractive face 571 is formed to project towards the front direction FD at a central portion in a cross-section along a radial direction of the acrylic cylindrical body 560. The refractive face 571 includes an inner slope portion 574a on the side of the inner periphery and an outer slope portion 574b on the side of the outer periphery. Both the slope portions 574a and 574b refracts the light guided by a transmissive wall portion 561 towards the light output direction OD. The light output direction OD in the fifth embodiment is defined as the direction of the normal line at a summit portion 562c between both the slope portions 574a and 574b. The refractive face 571 provides a refractive effect to collect the output light OB, which is going to diffuse or spread, towards the light output direction OD.

Even in the fifth embodiment, the output light OB is collected towards the light output direction OD by a combination of the refractive effect by the refractive face 571 and the light shielding effect by the light shielding wall 575.

This enables the reduction of the light which leaks in a direction different from the light output direction OD, and, simultaneously, the improvement of a luminance of the ambient-light luminous region 13. This configuration enables the ambient-light luminous region 13 to output light with a high luminance while helping prevent the ambient-light luminous region 13 from being reflected.

Further, in the fifth embodiment, the acrylic cylindrical body 560 and the ambient-light guide body 50 (refer to FIG. 3) may be also referred to as a transmissive member. The light output end face 562 may be also referred to as a light output face. The light collection structure 570 may be also referred to as a light collection device or means. The light shielding wall 575 may be referred to as a standing wall.

Sixth Embodiment

Figure 14:
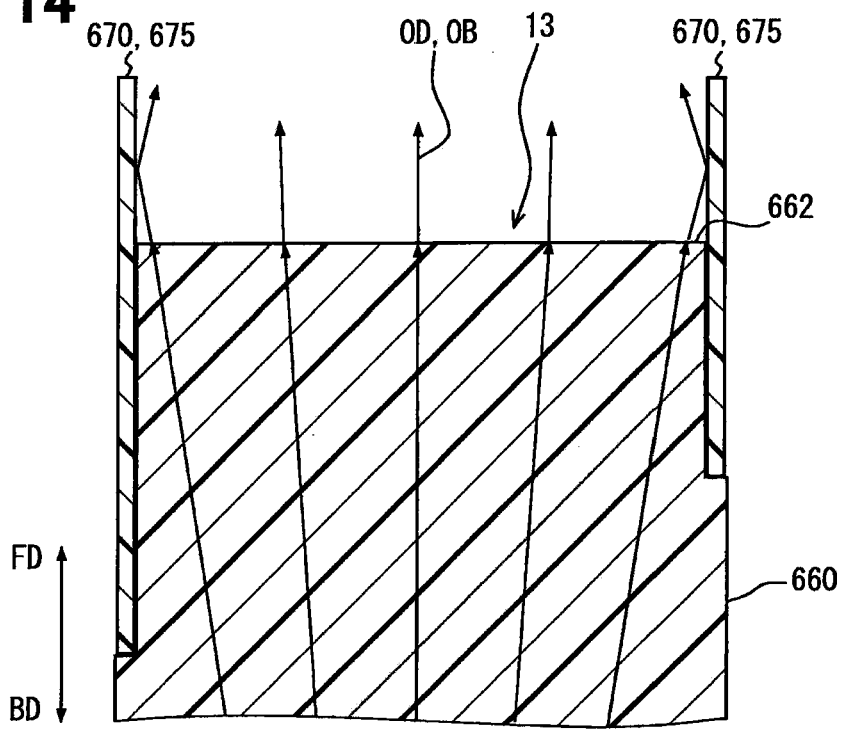
FIG. 14 is a diagram illustrating yet another modification example of FIG. 6 according to a sixth embodiment of the present disclosure.

The following explains a sixth embodiment that is another modification of the first embodiment with reference to FIG. 14. The light collection structure 670 in the sixth embodiment includes a light shielding wall 675 substantially identical to the light shielding wall 75 (refer to FIG. 6) of the first embodiment. In addition, the light collection structure 670 according to the sixth embodiment eliminates a constituent element equivalent to the refractive face 71 (refer to FIG. 6) of the first embodiment. The light output end face 662 is formed in a flat face facing the front direction FD.

Even in the sixth embodiment, the light shielding effect by the light shielding wall 675 collects the output light OB towards the light output direction OD which the light output end face 662 faces. This enables the reduction of the light which leaks in a direction different from the light output direction OD, and, simultaneously, the improvement of a luminance of the ambient-light luminous region 13. This configuration enables the ambient-light luminous region 13 to output light with a high luminance while helping prevent the ambient-light luminous region 13 from being reflected.

Further, in the sixth embodiment, the acrylic cylindrical body 660 and the ambient-light guide body 50 (refer to FIG. 3) may be also referred to as a transmissive member. The light output end face 662 may be also referred to as a light output face. The light collection structure 670 may be also referred to as a light collection device or means. The light shielding wall 675 may be referred to as a standing wall.

Other Embodiments

Up to this point, description has been given to the embodiments of the present disclosure. However, the present disclosure is not limited to the above embodiments, and it can be variously embodied within a scope not departing from essential points of the present disclosure.

In the above first embodiment, dividing the convex lens portion 72 forms the refractive face 71 having a thinned Fresnel lens shape. In addition, the second embodiment provides the refractive face 271 having a Fresnel lens shape including a plurality of slope portions 271*a*. Like the above configurations, the slope portions according to the fifth embodiment may be divided into a plurality of sub-portions to be arranged along a reference plane orthogonal to the light output direction OD; thereby, the refractive face may be provided to have a smaller thickness. In addition, when the curvature of the convex lens portion is much greater, this convex lens portion may be divided into much more sub-portions rather than the first embodiment.

In the above embodiments, the light collection structure is provided to have a circular-ring shape to surround the whole of the ambient-light luminous region 13. However, the refractive face and the light shielding wall which are included in the light collection structure may be formed in a part of the ambient-light luminous region 13. For example, the light collection structure may be formed only in a lower part (near "km/h" in FIG. 1) of the display region 11. Furthermore, the light collection structure may be formed only in a portion at diagonally upward right close to the side window SW (near "120" and "140" in FIG. 1).

In the above embodiments, the ambient-light luminous region 13 is formed in the circular-ring shape along the outer periphery of the display region 11. However, the shape of the ambient-light luminous region may be changed suitably. For example, the ambient-light luminous region may have a shape formed by a plurality of straight lines to surround the display region 11. Alternatively, the ambient-light luminous region has a non-fully-circular ring shape to contain an interrupted portion.

In the above embodiments, the light output direction OD of the output light OB is specified in the direction along the front direction or display direction FD. However, the light output direction OD or the direction in which the light output end face faces may be change suitably within a scope to suppress the ambient-light luminous region from being reflected to a rearview mirror or a side window.

In the above first embodiment, the light emitted from the ambient light source is guided by the ambient-light guide body to enter the acrylic cylindrical body. There is no need to be limited to such a light guide manner. For instance, like the above third embodiment, a light transmission manner may be used which permits an ambient light source located directly under an acrylic cylindrical body in the back direction BD to emit light directly entering the ambient-light cylindrical body. As mentioned above, the transmissive member may be suitably configured as long as guiding light into a light output face forming an ambient-light luminous region.

In the above embodiments, the heights from the reference plane RP of the respective shielding wall portions 76 and 77 are identical to each other. However, the height of each shielding wall portion may adjusted suitably so as not to permit the light leaking from a luminous region to reach a rearview mirror or side window depending on the position relation of the luminous region and the rearview mirror or side window. To be specific, the height of an outer peripheral shielding wall portion may be provided to be higher than the height of an inner peripheral shielding wall portion. Alternatively, either of an inner peripheral shielding wall portion or outer peripheral shielding wall portion may be omitted. Furthermore, a shielding wall portion may be interrupted partially.

In the above embodiments, each auxiliary wall portion 78 and 79 is extended from each shielding wall portion 76 and 77 in the back direction BD, respectively. However, such an auxiliary wall portion may be omitted. Alternatively, each auxiliary wall portion may be provided to extend along a transmissive wall portion in the back direction BD to reach a light input end face.

In the above embodiments, the light amount of light emitted from the ambient light source 43 is varied depending on the luminance in vicinity of the vehicle based on the state information of the headlight. However, the light amount by the ambient light source 43 or the luminous intensity of the ambient-light luminous region 13 may be set constant irrespective of the luminance in vicinity of the vehicle. Furthermore, for instance, the combination meter 100 may further include a constituent element equivalent to a light control sensor 97. The meter control circuit acquiring an output of the light control sensor may change continuously the light amount of the light emitted from the ambient light source depending on the luminance in vicinity.

In the above embodiments, the refractive face 71 is formed to be integrated with the light output end face 62. However, the refractive face and the light output end face may be formed independently. For example, a lens having a refractive face providing a light collection function may be arranged to be separate from a light output end face, in the light output direction OD. In such a configuration, the lens may be supported by a light shielding wall standing from the light output end face, for instance.

In the above, an embodiment of the present disclosure is applied to a speedometer displaying a travel speed of a vehicle in a combination meter mounted in the vehicle, for instance. However, the present disclosure may be applied to a tachometer, a fuel gauge, a water thermometer without need to be limited to the speedometer, for example. Furthermore, the present disclosure may be applied to a display apparatus generally used for various consumer appliances or various transport machines without need to be limited to a vehicular display apparatus.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A vehicular display apparatus in a vehicle, the vehicular display apparatus providing a luminous region that outputs luminance, the luminous region surrounding a display region that displays vehicular information,
the vehicular display apparatus comprising:
   a light source to emit light;
   a transmissive member made of a light transmissive material and receiving the light emitted from the light source, the transmissive member having a light output face that outputs the light received from the light source as an output light to form the luminous region surrounding the display region; and
   a light collection device that is integrated with the transmissive member to be adjacently surrounding the light output face so as to collect the light outputted by the light output face towards a light output direction in which the light output face faces,
   the light collection device including
      a refractive face providing refraction to collect the output light towards the light output direction, the refractive face being formed to be integrated with the light output face, and
      a light shielding wall that is integrated with the transmissive member and connected with the light output face, the light shielding wall standing towards the light output direction by protruding from a boundary portion where the light output face is connected with the light shielding wall as providing a light shielding effect to the light outputted in the light output direction by the light output face in the transmissive member.

2. The vehicular display apparatus according to claim 1, wherein
   the refractive face forms a convex lens portion providing a convex projecting towards the light output direction.

3. The vehicular display apparatus according to claim 1, wherein
   the refractive face is divided into a plurality of sub-faces that are aligned in a direction orthogonal to the light output direction.

4. The vehicular display apparatus according to claim 1, wherein
   the refractive face is integrated into the light output face, forming the light luminous region.

5. The vehicular display apparatus according to claim 1, wherein:
   the light output face is provided along an outer periphery of the display region; and
   the light shielding wall includes an inner peripheral wall portion and an outer peripheral wall portion opposite to the inner peripheral wall portion such that the light output face intervenes between the inner peripheral wall portion and the outer peripheral wall portion,
      the inner peripheral wall portion standing closer to the display region than the light output face,
      the outer peripheral wall portion standing farther from the display region than the light output face.

6. The vehicular display apparatus according to claim 1, wherein
   the light shielding wall includes a back-extension wall portion that extends from the light output face in a direction opposite to the light output direction.

7. The vehicular display apparatus according to claim 1, further comprising:
   a light-dark acquisition section to acquire light-dark information on lightness and darkness, the light-dark information indicating a luminance in vicinity of the vehicle; and
   a light source control section to reduce a light amount emitted from the light source as the luminance in vicinity of the vehicle becomes darker based on the light-dark information acquired by the light-dark acquisition section.

8. The vehicular display apparatus according to claim 1, wherein
   the light shielding wall is standing towards the light output direction from the boundary portion adjoining the refractive face formed in the light output face in the transmissive member, suppressing the light outputted from the light output face from leaking to a direction that is different from the light output direction.

9. The vehicular display apparatus according to claim 1, wherein the light output face defines a full circular light output face.

10. The vehicular display apparatus according to claim 1, wherein the light shielding wall is a resin wall providing a light shielding effect.

11. The vehicular display apparatus according to claim 1, wherein the light shielding wall is made of a light non-transmissive material.

12. The vehicular display apparatus according to claim 1, wherein the light output face is an annular face.

13. The vehicular display apparatus according to claim 1, wherein:
   the light output face is formed in a first ring shape along an outer periphery of the display region; and
   the light shielding wall is formed in a second ring shape along the first ring shape of the light output face, the light shielding wall including an inner peripheral wall portion and an outer peripheral wall portion opposite to the inner peripheral wall portion such that the light output face in the first ring shape intervenes between the inner peripheral wall portion of the second ring shape and the outer peripheral wall portion of the second ring shape, the inner peripheral wall portion standing closer to the display region than the light output face, the outer peripheral wall portion standing farther from the display region than the light output face.

14. A vehicle display apparatus in a vehicle, the vehicle display apparatus comprising:

a display region that displays vehicular information to a driver of the vehicle;

a luminous region that outputs luminous, the luminous region surrounding the display region;

a light source emitting light;

a transmissive member made of a light transmissive material, the transmissive member receiving the light emitted from the light source, the transmissive member having a light output face outputting the light received from the light source to form the luminous region;

a refractive face integrated with the light output face, the refractive face refracting the light outputted from the light output face in a light output direction toward the driver of the vehicle; and a light shielding wall providing a light shielding effect, the light shielding wall integrated with the transmissive member and connected with the light output face with which the refractive face is integrated, the light shielding wall extending directly from the light output face with which the refractive face is integrated in the light output direction toward the driver of the vehicle.

15. The vehicular display apparatus according to claim 14, wherein the luminous region is an annular region fully encircling the display region.

16. The vehicular display apparatus according to claim 14, wherein the light shielding wall is made of a light non-transmissive material.

17. The vehicular display apparatus according to claim 14, wherein the light shielding wall defines an open annular space between the refractive face and the driver of the vehicle.

18. A vehicular display apparatus in a vehicle, the vehicular display apparatus providing on a front side facing a driver seat of the vehicle (i) a display region that displays vehicular information and (ii) a luminous region that outputs luminance, the luminous region surrounding the display region, both the display region and the luminous region being viewed from the driver seat, the vehicular display apparatus comprising:

a light source arranged on a side opposite to the driver seat with respect to the front side to emit light for the luminous region;

a transmissive member made of light transmissive material and arranged in front of the light source to receive the light emitted from the light source, the transmissive member having a light output face that outputs the light received from the light source in a light output direction toward the driver seat as an output light so that the luminous region is viewed from the driver seat as surrounding the vehicular information displayed on the display region;

a refractive face integrated with the light output face, the refractive face refracting the light outputted from the light output face in the light output direction; and a light shielding wall that is integrated with the transmissive member and connected to the light output face with which the refractive face is integrated, the light shielding wall protruding towards the light output direction from a boundary portion where the light output face is connected to the light shielding wall as suppressing the light outputted by the light output face from leaking to a direction different from the light output direction by providing a light shielding effect to the light outputted by the light output face in the light output direction.

19. The vehicular display apparatus according to claim 18, wherein:

the light output face is formed in a first ring shape along an outer periphery of the display region; and the light shielding wall is formed in a second ring shape along the first ring shape of the light output face, the light shielding wall including an inner peripheral wall portion and an outer peripheral wall portion opposite to the inner peripheral wall portion such that the light output face in the first ring shape intervenes between the inner peripheral wall portion of the second ring shape and the outer peripheral wall portion of the second ring shape, the inner peripheral wall portion standing closer to the display region than the light output face, the outer peripheral wall portion standing farther from the display region than the light output face.

\* \* \* \* \*